United States Patent
Napoli

[11] 3,708,816
[45] Jan. 9, 1973

[54] VEHICLE WASHING APPARATUS

[76] Inventor: Angelo Napoli, 1609 Wills Place, Vineland, N.J. 08360

[22] Filed: Sept. 9, 1970

[21] Appl. No.: 70,851

[52] U.S. Cl. .................................15/21 E, 15/DIG. 2
[51] Int. Cl. .................................................B60s 3/06
[58] Field of Search..........15/DIG. 2, 21 D, 21 E, 53, 15/97

[56] References Cited

UNITED STATES PATENTS

| | | | |
|---|---|---|---|
| 3,543,319 | 12/1970 | Posner | 15/21 E |
| 3,579,700 | 5/1971 | Haley | 15/21 E |
| 3,304,565 | 2/1967 | Fuhring | 15/21 E |

*Primary Examiner*—Edward L. Roberts
*Attorney*—Brenner, O'Brien & Guay

[57] ABSTRACT

Vehicle washing apparatus including a frame upon which is mounted a pair of opposing side brush assemblies each having a vertically oriented side brush hung from the free end of a parallelogram linkage assembly which is pivotally suspended from an overhead shaft so as to permit controlled pivotal movement transversely of the frame as well as damped, spring-cushioned pivotal movement longitudinally of the frame whereby the front, rear and side areas of a vehicle may be efficiently washed.

4 Claims, 20 Drawing Figures

INVENTOR
ANGELO NAPOLI

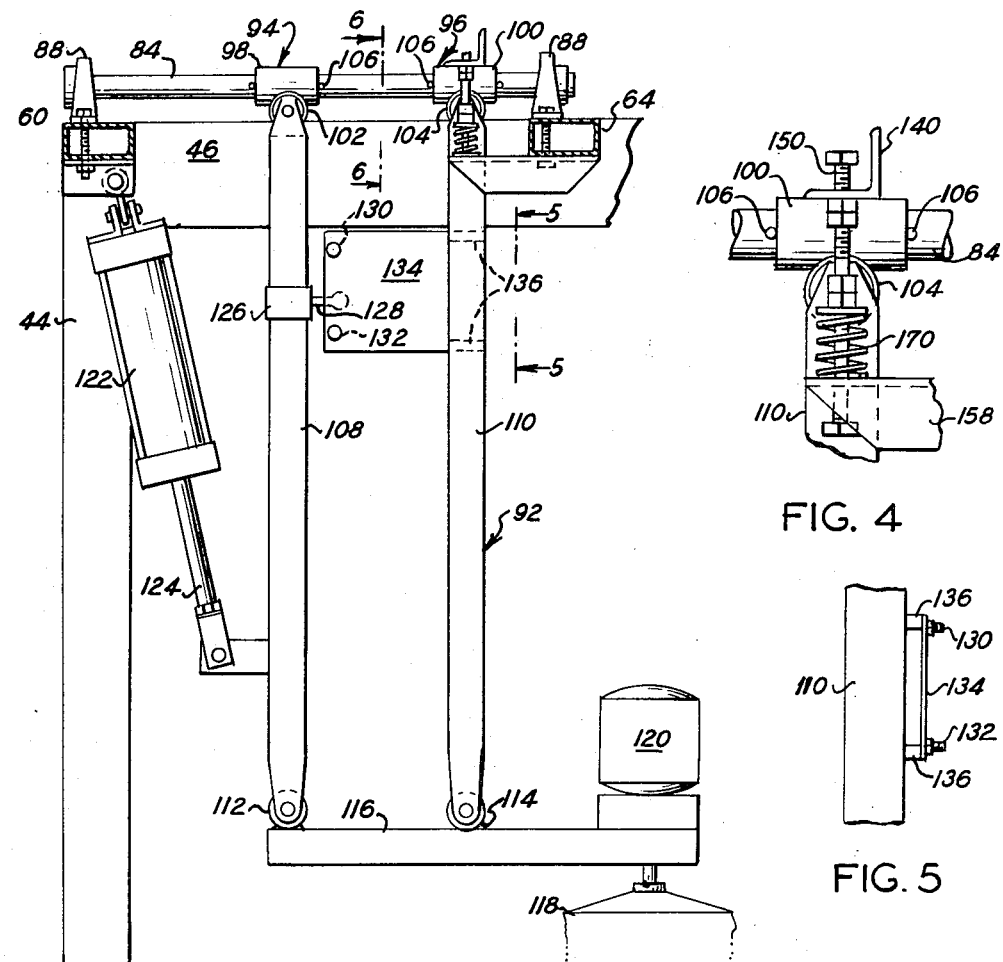
FIG. 2
FIG. 4
FIG. 5
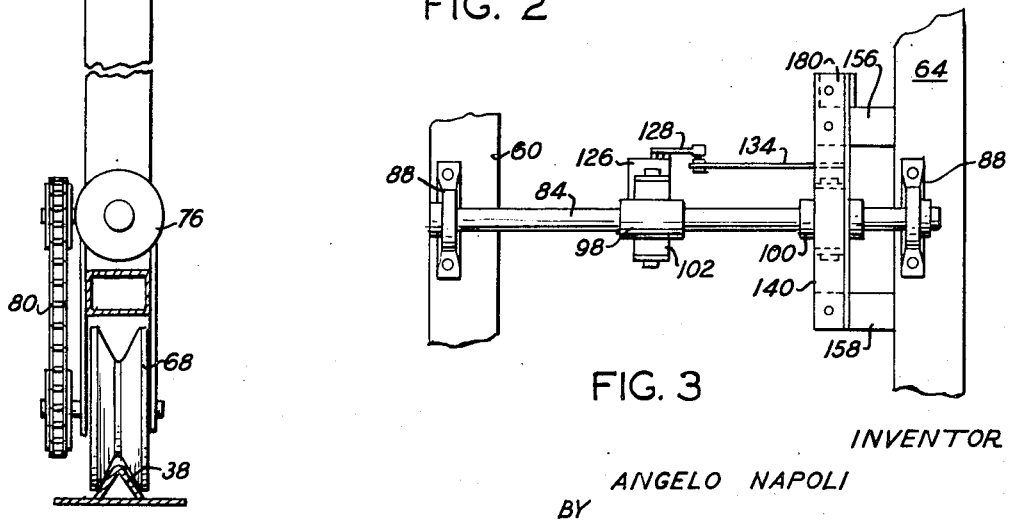
FIG. 3
INVENTOR
ANGELO NAPOLI

INVENTOR
ANGELO NAPOLI

ATTORNEYS

VEHICLE WASHING APPARATUS

BACKGROUND OF THE INVENTION

1. Field of the Invention

The present invention pertains to vehicle washing apparatus and more particularly to an improved vehicle side washing apparatus wherein a pair of rotating side brushes are moved relative to a vehicle for automatically washing the front, rear and side surfaces thereof.

2. Description of the Prior Art

Numerous car wash systems have been developed in the past to rapidly and efficiently clean a vehicle. Automated systems of this type are generally preferred in view of the low operating expenses involved; however, such systems are generally inefficient in that they do not always provide a thorough washing due to the automated nature of their operation. Conventional washing installations of this type are manually or coin operated and typically include a set of water spray nozzles which cooperate with a series of washing brushes mounted upon a suitable frame so as to contact the side and top surfaces of the vehicle thereby removing the accumulated dirt and road film. In such systems, the vehicle side brushes are rotated about a vertical axis and are fixedly or pivotally mounted upon the frame for movement relative to the vehicle. The side surfaces of vehicles have been found to be extremely difficult to wash automatically due to their irregular surface configuration and the varied projections encountered especially at their front and rear ends. As a result, many types of vehicles are left with unwashed surfaces, and the side brushes often interfere with or become entangled with projections such as antennas.

The prior art, as exemplified by U. S. Pat. No. 3,304,565, is generally cognizant of vehicle side brush apparatus which, as an attempted solution to the above mentioned problems, is adapted to move upon a frame transversely as well as longitudinally of a vehicle. Such arrangements, however, have proven to be mechanically complex, are relatively expensive to produce and often tend to exhibit undesired and uncontrollable brush movement especially when such brushes encounter vehicle protrusions such as antennas and irregular front and rear surface contours.

SUMMARY OF THE INVENTION

Accordingly, it is an object of the present invention to construct a vehicle washing apparatus having vertically oriented rotating side brushes mounted for controlled transverse movement as well as limited longitudinal movement with respect to a vehicle for efficiently washing the irregular front, rear and side surfaces thereof.

Another object of this invention is to suspend a pair of rotating side brushes from parallelogram linkage assemblies mounted for controlled transverse translational movement and damped, spring-cushioned longitudinal movement in a vehicle washing installation.

The present invention is generally characterized in the combination in a vehicle washing installation of a parallelogram linkage assembly mounted upon a frame longitudinally movable past a vehicle to be washed for controlled translational movement in a transverse plane, a brush pivotally suspended from a lower end of the parallelogram linkage assembly for rotation about a vertical axis, the parallelogram linkage assembly being rotatably supported at an upper end upon the frame for longitudinal movement about a transverse axis, and a spring assembly between the linkage assembly and the frame biasing the linkage assembly to a substantially vertical position and restraining the longitudinal movement thereof about the transverse axis whereby irregular surface contours and protrusions of the vehicle may be effectively accommodated by the brush.

The present invention is advantageous over the prior art in that irregular front, rear and side surfaces of a vehicle are efficiently washed by simple and relatively inexpensive apparatus, and that side washing brushes may be moved transversely of the vehicle so as to sequentially contact the sides thereof and to sweep across the front and rear ends thereof while simultaneously exhibiting damped, spring-cushioned movement longitudinally of the vehicle for accommodating vehicle side projections as well as irregular front and rear surface contours to thoroughly wash the same.

Further objects and advantages of the present invention will become apparent from the description of the preferred embodiment when considered in conjunction with the accompanying drawings.

BRIEF DESCRIPTION OF THE DRAWINGS

FIG. 2 is a sectional view taken along line 2—2 of FIG. 1;

FIG. 3 is a plan view of the detail of FIG. 2;

FIG. 4 is a detail of the spring assembly of FIG. 2;

FIG. 5 is a sectional view taken along line 5—5 of FIG. 2;

DESCRIPTION OF THE PREFERRED EMBODIMENT

Figure 1:
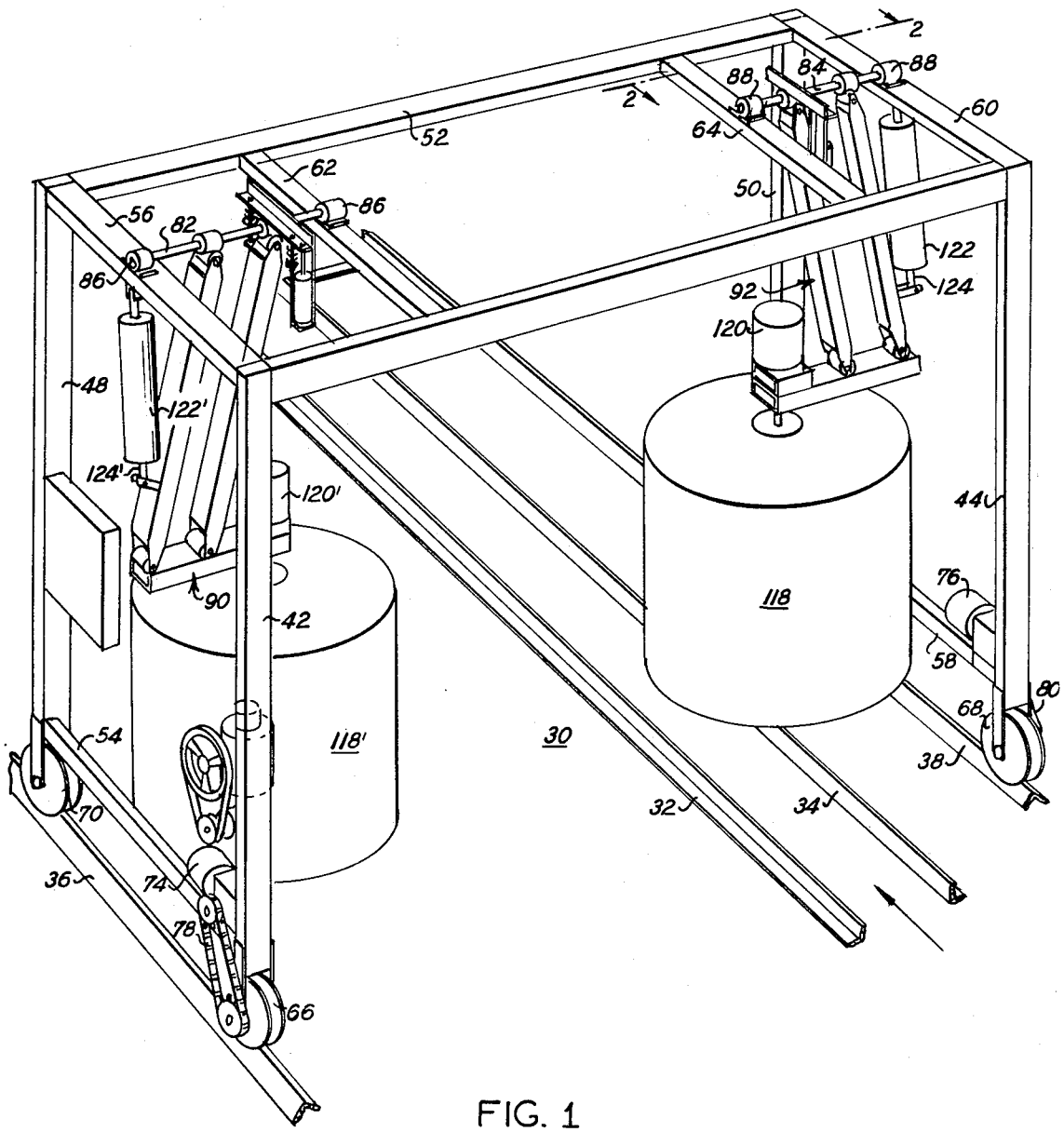
FIG. 1 is a front perspective view of a vehicle washing apparatus according to the present invention.

The present invention is embodied in a vehicle washing installation illustrated in FIG. 1 and having a washing area 30 upon which are mounted a pair of vehicle tire guide rails 32 and 34 and a pair of triangular tracks 36 and 38. Tire guide rails 32 and 34 may be of any suitable construction and are mounted to one side of the desired centerline of travel of a vehicle to be washed so as to accurately position the same as it enters washing area 30.

A rectangular open frame, indicated generally at 40, is adapted to be movable along tracks 36 and 38 during the washing operation and includes a first pair of vertical stanchions 42 and 44 interconnected by a transverse, upper horizontal frame member 46 and a second pair of vertical stanchions 48 and 50 similarly interconnected by a transverse, upper horizontal frame member 52. Stanchions 42 and 48 are interconnected at their respective ends by a pair of longitudinal horizontal frame members 54 and 56, and stanchions 44 and 50 are similarly interconnected at their respective ends by a pair of longitudinal horizontal frame members 58 and 60.

An additional pair of longitudinal horizontal frame members 62 and 64 are connected between transverse frame members 46 and 52 in spaced parallel relation with longitudinal frame members 56 and 60, as shown. It is noted that the frame members may be constructed from any suitable material, such as hollow rectangular steel tubing, and are preferably welded or bolted together to form a rigid support assembly for the brush and control assemblies to be described below. It is also noted that additional corner braces (not shown) may be used to add further rigidity to frame assembly 40 if desired.

A pair of front wheels 66 and 68 are journaled for rotation through the lower ends of stanchions 42 and 44, respectively, and a pair of rear wheels 70 and 72 are similarly journaled for rotation through the lower ends of stanchions 48 and 50, respectively. It should be understood, of course, that wheels 66, 68, 70 and 72 may be mounted directly to the stanchions or through suitable bearings so as to enable free movement of frame 40 along tracks 36 and 38. A pair of electric motors 74 and 76 are mounted upon longitudinal frame members 54 and 50, respectively, and are connected through gear and sprocket assemblies 78 and 80 to the front wheels 66 and 68 to apply drive power to the wheels for moving frame 40 along the tracks.

Referring to FIGS. 1-6, a pair of shafts 82 and 84 are transversely disposed between longitudinal frame members 56 and 62 and 60 and 64, respectively, and are journaled for rotation through bearings 86 and 88 which are secured to the upper surface of the frame members by suitable bolts A pair of parallelogram linkage assemblies 90 and 92 are supported upon shafts 82 and 84, respectively, and are each substantially identical in construction; for the sake of brevity, only linkage assembly 92 will be described in detail with similar structures of linkage assembly 90 being given primed reference numerals.

As shown in FIG. 2, parallelogram linkage assembly 92 includes a pair of spaced bearing assemblies 94 and 96 each having first and second perpendicularly attached bearings 98-100 and 102-104 with bearings 98 and 100 disposed upon shaft 84 and maintained in their spaced relationship by suitable retaining pins 106. It is noted that bearings 98 and 100 may be rotatably disposed upon shaft 84 or may be fixedly attached thereto since shaft 84 is itself journaled for rotation with bearings 88.

A pair of parallel upright connecting rods 108 and 110 are journaled at their upper ends for rotation through bearings 102 and 104, respectively, and are similarly journaled at their lower ends for rotation through bearings 112 and 114, respectively, of a horizontal cross-member 116. As shown in FIG. 2, bearing 112 is attached as by welding to the upper surface of horizontal cross-member 116 at an outer end thereof, with bearing 114 similarly attached at an intermediate point along the top surface. Rotatably suspended from the inner end of horizontal cross-member 116 is a conventional washing brush 118 having a vertical shaft carrying a plurality of long fiber strands which are extended by centrifugal force whenever the brush is rotated. Mounted on the top surface of the horizontal cross-member 116 is superposition with brush 118 is a reversible electric motor 120 which is connected to the vertical shaft of brush 118 to rotate the same in either a clockwise or a counterclockwise direction.

A pneumatic cylinder 122 is pivotally mounted at an upper end upon the undersurface of longitudinal frame member 60 by a double hinge assembly so as to permit transverse as well as longitudinal movement thereof with respect to the frame 40. Cylinder 122 has a piston 124 which is pivotally mounted at a lower end to upright connecting rod 108 of parallelogram linkage assembly 92 for sequentially controlling the translational movement thereof.

As illustrated in FIG. 2, an electrical switch 126 is fixedly secured to upright connecting rod 108 of linkage assembly 92 adjacent its upper end and has a rotatable control arm 128 extending from a side thereof toward connecting rod 110. Control arm 128 has a roller bearing mounted upon the distal end thereof for selective engagement with one of a pair of spaced bolts 130 and 132 secured to the corners of a generally rectangular actuator plate 134 which, as illustrated in FIG. 5, is attached by a pair of spacing blocks 136 to upright connecting rod 110. As will be more fully explained below, the control arm 128 of electric switch 126 is engaged by the protruding bolts 130 and 132 as the parallelogram linkage assembly 92 is translationally moved by piston 124 of pneumatic cylinder 122. It is noted that electric switch 126 may be of any suitable type such an a normally-open single-pole, single-throw switch which is adapted to be closed in response to either clockwise or counterclockwise rotation of control arm 128 upon engagement by the bolts of actuator plate 134.

Figure 6:
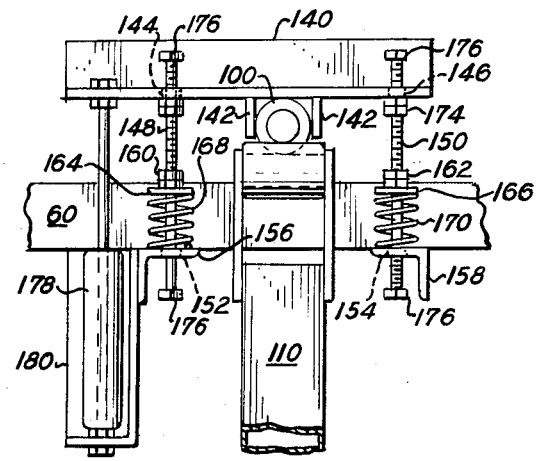
FIG. 6 is a sectional view taken along line 6—6 of FIG. 2.

As illustrated in FIG. 6, linkage assembly 92 also includes a rigid angle bracket 140 which is fixedly attached to the top of bearing 100 of bearing assembly 96 by any suitable means such as welding and is provided with additional side support by a pair of rectangular ears 142 firmly secured as by welding to each side of bearing 100 as illustrated. Bracket 140 defines a pair of holes 144 and 146 for freely accommodating a respective one of a pair of threaded rods 148 and 150 which extend downwardly through holes 152 and 154 in a respective one of a pair of angle brackets 156 and 158 attached to the undersurface of longitudinal frame member 60.

A pair of self-locking nuts 160 and 162 are threaded upon rods 148 and 150, respectively, and cooperate with a pair of spring retaining washers 164 and 166 and a pair of springs 168 and 170, respectively, to define the vertical position of the threaded rods with respect to angle brackets 156 and 158. A second pair of self-locking nuts 172 and 174 are threaded upon rods 148 and 150, respectively, and are adjusted to contact the lower surface of angle bracket 140 so as to bias the parallelogram linkage assembly to a substantially vertical position. Additional self-locking nuts 176 may be threaded onto the ends of rods 148 and 150, if desired, to preclude the rods from becoming displaced from their proper position between bracket 140 and brackets 156 and 158. It should be understood that while any number of spring arrangements may be utilized to vertically bias the parallelogram linkage assemblies, the illustrated structure is preferred since it readily facilitates adjustment of the normal or biased position of the linkage assemblies as will be more fully described below. An automobile-type shock absorber 178 is additionally mounted between the left end of bracket 140, as visualized in FIG. 6, and a generally L-shaped bracket 180 which is fixed attached to angle bracket 156 and extends below longitudinal frame member 60 so as to accommodate the body of the shock absorber and permit movement thereof during operation of the washing apparatus.

Figure 7:
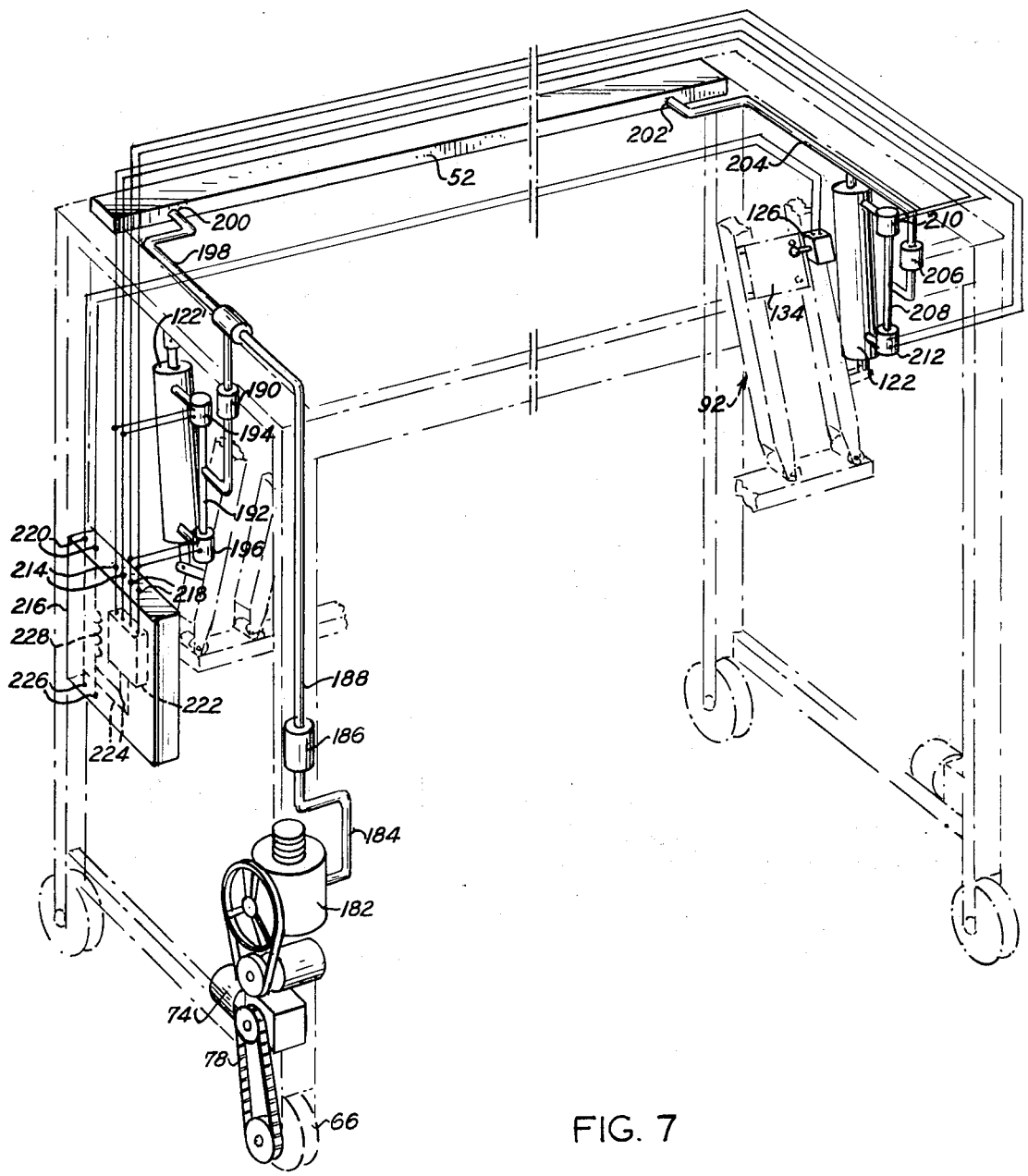
FIG. 7 is a schematic perspective view of the pneumatic control system of the vehicle washing installation of FIG. 1.

The control assembly for the vehicle washing apparatus according to the present invention is schematically illustrated in FIG. 7 and includes an electric motor driven compressor 182 which is mounted upon stanchion 42 just above wheel drive motor 74. A suitable air conduit 184 is connected to an outlet port of compressor 182 for feeding pressurized air from the compressor through a one-way check valve 186, a pressure line 188 and an adjustable pressure regulator 190 to a branched conduit 192 for pneumatic cylinder 122'. Branched conduit 192 is connected to the upper and lower inlet ports of pneumatic cylinder 122' by a pair of electrically controlled pneumatic valves 194 and 196.

Pressure line 188 is also connected via a conduit 198 to a first port 200 of an accumulator tank which is formed by sealing the transverse frame member 52 at each end to form an air tight chamber. In this manner, the accumulator for the pneumatic system becomes an integral part of the frame assembly 40 at a reduction of both size and cost. A second port 202 of the accumulator tank 52 communicates via a pressure line 204 and an adjustable pressure regulator 206 with a branched conduit 208 which feeds the upper and lower inlet ports of pneumatic cylinder 122. Branched conduit 208 is connected to the upper and lower inlet ports of pneumatic cylinder 122 by a pair of electrically controlled pneumatic valves 210 and 212.

Electrically operated valves 194 and 210 are wired in parallel across a first set of terminals 214 of a control box 216 which is mounted upon vertical stanchion 48 of frame 40. Similarly, pneumatic valves 196 and 212 are electrically wired in parallel across a second set of terminals 218 of control box 216. In addition, the control switch 126 of linkage assembly 92 is connected to a third set of terminals 220 of the control box as illustrated. Control box 216 may include any number of various circuit arrangements for enabling manual and/or automatic operation of the vehicle washing apparatus according to the present invention depending upon the desired operation. For the sake of clarity, the control circuit is illustrated diagrammatically in FIG. 7 and includes a conventional stepping switch 222 which has its input or common pole connected via leads 224 to a pair of terminals 226 which are adapted to be connected with a suitable source of power. The output or fixed contacts of stepping switch 222 are connected with the first and second sets of terminals 214 and 218 of the control box 216 so as to sequentially energize the control valves for pneumatic cylinders 122 and 122'. An energizing winding 228 for stepping switch 222 is connected in series with control switch 126 via the third set of terminals 220 of control box 216 across the power input terminals 226 thereof.

The operation of the sequencing and control assembly illustrated in FIG. 7 will be explained with the aid of FIGS. 8, 9 and 10 which are diagrammatic views of the parallel linkage assembly in first, second and third operative positions, respectively.

Figure 8:
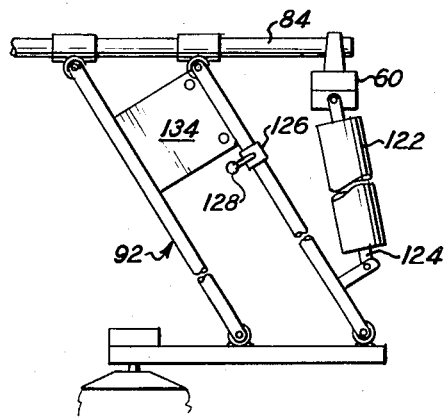
FIGS. 8, 9 and 10 are diagrammatic views of the electrical control switch assembly of the vehicle washing installation of FIG. 1 illustrated in first, second and third operative positions, respectively.

In FIG. 8, parallelogram linkage assembly 92 is illustrated in its withdrawn or park position with pressurized air being fed into the lower port of air cylinder 122 so as to withdraw the piston 124 into the interior thereof. With the linkage assembly in its park position as shown, the control switch 126 is spaced from and is slightly below the bottom edge of actuator plate 134 with the pneumatic valves 196 and 212 being energized from the stepping switch 222. After a vehicle has been properly positioned within the washing area, the stepping switch 22 is manually or automatically sequenced to deenergize valves 196 and 212 (FIG. 7) to vent the air cylinders and permit the linkage assemblies to move inwardly under the force of gravity. As the linkage assemblies move down, the actuator plate 134 moves toward the control switch 126 until bolt 132 thereof engages the control arm 128 in the position illustrated in FIG. 9 causing the electrical switch to become closed such that the energization winding 228 (FIG. 7) is energized to move the stepping switch 222 to its next position. In this position, electrical power is supplied to the upper pneumatic valves 194 and 210 whereupon pressurized air is fed through the upper ports of air cylinders 122 and 122'. Pistons 124 and 124' will thereafter become extended causing the parallelogram linkage assemblies to move transversely to the position shown in FIG. 10 whereupon the upper bolt 130 of actuator plate 134 engages the control arm 128 of switch 126 to sequence the stepping switch 222 thereby deenergizing electric valves 194 and 210 to vent the air cylinders and permit them to return toward the position illustrated in FIG. 9 under the force of gravity. As the linkage assembly returns to the position shown in FIG. 9, the lower bolt 132 of actuator plate 134 will again engage the control arm of switch 126 causing the energization of the lower pneumatic valves 196 and 212 to withdraw the pistons of air cylinders 122 and 122' returning the linkage assemblies to their park positions shown in FIG. 8.

It can thus be seen that the electric switch 126 cooperates with the actuator plate 134 and the stepping switch 222 to control the operative position of the pneumatic cylinder in accordance with the detected translational position of linkage assembly 92. Referring again to FIG. 7, since the air cylinders 122 and 122' are energized in accordance with the position of linkage assembly 92 only as sensed by control switch 126, the air cylinder pressure regulators 190 and 206 are adjusted to supply a slightly greater pressure to the air cylinder 122' for the "follower" linkage assembly 90 than is supplied to the air cylinder 122 for the "control" linkage assembly 92. In this manner, the "follower" linkage assembly 90 is much less likely to become stalled or hung-up on any of the various irregular vehicle protrusions than is the "control" linkage assembly 92 so that the linkage position as sensed by control switch 126 is more accurately representative of the position of both linkage assemblies even though it is mounted only upon linkage assembly 92.

The operation of the vehicle washing apparatus according to the present invention will be described with reference to FIGS. 11-20 which schematically illustrate the various operational steps involved in the washing of a vehicle. A vehicle to be washed is driven into the car wash area 30 until the right front tire engages a suitable stop 230 whereupon the vehicle is stopped and remains in this position throughout the washing sequence. As mentioned above, the washing apparatus according to the present invention may be automatically operated in response to the placing of a predetermined amount of money in a conventional coin box located at the entrance to the washing installation.

Figure 11:
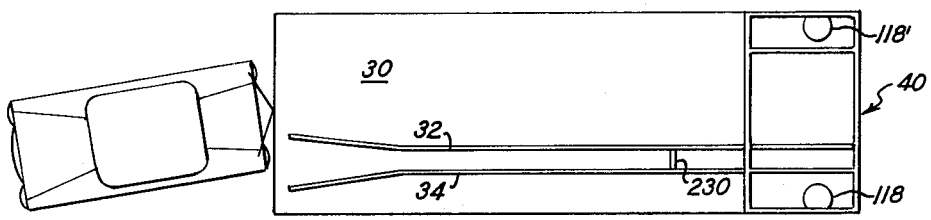
FIGS. 11 through 20 are schematic representations of the various washing steps performed by the vehicle washing installation of FIG. 1.
Figure 12:
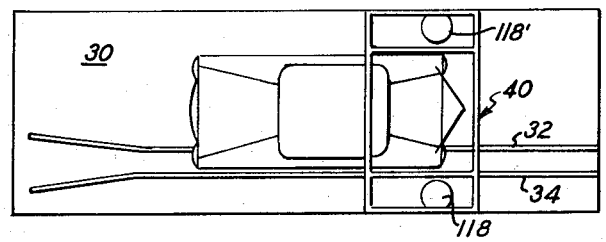

The initial position of brushes 118 and 118' and the movable frame 40 prior to the entrance of the vehicle is illustrated in FIG. 11. Brush 118 and 118' are in their park positions with the parallelogram linkage assemblies held in a withdrawn position as illustrated in FIG. 8 by the pneumatic cylinders 122 and 122'. Neither of the brushes are rotating at this time and frame 40 is in a standby position at the exit end of the washing area 30.

Figure 13:
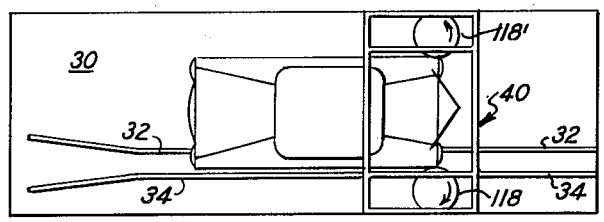

As the vehicle enters the washing installation and engages stop 230, the system is either automatically started by a switch cooperating with stop 230 or manually actuated by an operator. Upon actuation of the washing apparatus, motors 74 and 76 (FIG. 1) are energized to slowly drive the frame 40 along tracks 36 and 38. After a short time delay, frame 40 will have reached the position depicted in FIG. 12 and the pneumatic cylinders 122 and 122' will be vented under the control of a conventional timer to permit the linkage assemblies 90 and 92 to move inwardly toward the position illustrated in FIG. 9. At this same time, a suitable water and detergent mixture will be sprayed against the vehicle through a nozzle assembly (not shown) and the reversible electric motors 120 and 120' for the brushes 118 and 118' will be energized to rotate brush 118 in a clockwise direction and brush 118' in a counterclockwise direction as shown in FIG. 13.

Figure 9:
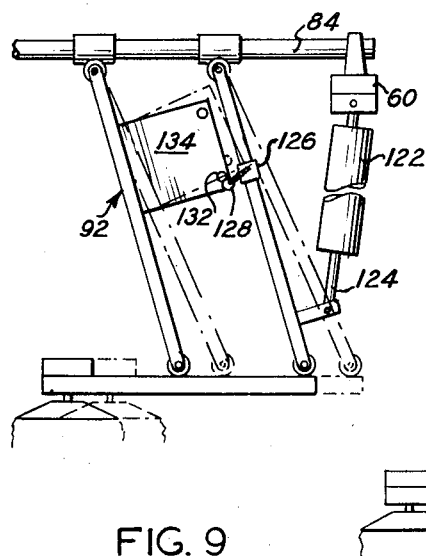

With the brushes rotating and engaging the side surfaces of the vehicle, the linkage assemblies 90 and 92 will be in the position illustrated by the dotted lines in FIG. 9 with the pneumatic cylinders 122 and 122' vented to the atmosphere. In this manner, the linkage assemblies are free to translationally move in a direction transverse to the vehicle with the brushes being maintained in contact with the side surfaces of the vehicle under the force of gravity.

Figure 14:
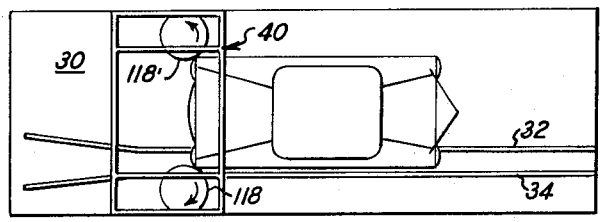

As the brushes 118 and 118' wash the sides of the vehicle, the frame 40 will continue moving along tracks 36 and 38 until the brushes engage the rear corners of the vehicle as shown in FIG. 14. The brushes will then begin to drop inwardly until the linkage assemblies reach the position shown in FIG. 9 causing the actuation of switch 126 to deenergize drive motors 74 and 76 of frame 40 and to simultaneously move the linkage assemblies inwardly toward each other for washing the rear surface of the vehicle as shown in FIG. 15.

It is important to note that as the brushes 118 and 118' are being transversely moved across the rear of the vehicle, the parallelogram linkage assemblies are permitted to move longitudinally of the vehicle due to the pivotal mounting thereof upon shafts 82 and 84 (FIG. 1). Referring to FIG. 6, it will be appreciated that as the parallelogram linkage assemblies rotate slightly about shafts 82 and 84, springs 168 and 170 will be alternately compressed in accordance with the movement of the angle bracket 140 such that the assemblies are normally biased to a substantially vertical position. The linkage assemblies in addition to being spring biased to the vertical position, are effectively controlled against undesirable longitudinal oscillatory movements by the shock absorbers 178 and 178' such that all of the unusual and unique surface contours encountered by brushes 118 and 118' will be effectively accommodated thereby so as to assure thorough washing of the same. It is additionally noted that the spring assemblies illustrated in detail in FIG. 6 are preferably adjusted by the self-locking nuts 160, 162, 172 and 174 such that when the linkage assembly is vertical, both springs are only slightly compressed. As the assembly rotates in one direction or the other, one of the two springs will become further compressed with the other spring being completely released. Because of such arrangement, the precise sizing of the springs utilized is not critical and may be readily accommodated by adjustment of the self-locking nuts.

Figure 10:
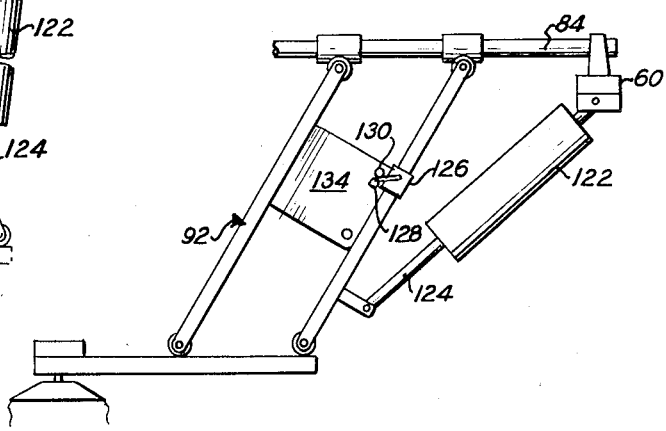
Figure 15:
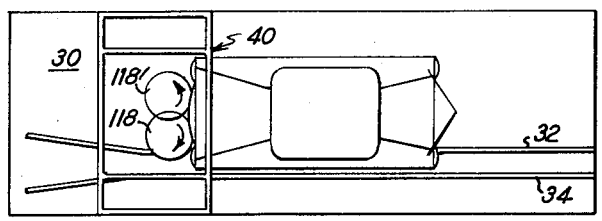
Figure 16:
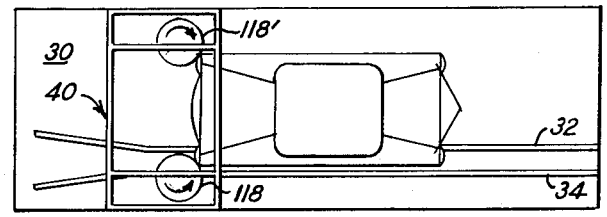

After the brushes 118 and 118' have been fully extended to the positions illustrated in FIGS. 10 and 15, switch 126 will be engaged by bolt 130 of actuator plate 134 to sequence the stepping switch 222 so as to withdraw the linkage assemblies for engaging the sides of the vehicle once again as illustrated in FIG. 16. At this same time, the direction of rotation of brushes 118 and 120 is reversed so that the brush rotation will aid the movement of the linkage assemblies at all times.

As the brushes reach the rear corners of the vehicle as seen in FIG. 16 the control switch 126 will again be actuated to cause the venting of air cylinders 122 and 122' and the energization of drive motors 74 and 76 whereupon the frame 40 will slowly move back past the vehicle with the brushes washing the side surfaces thereof for the second time. Due to the freedom of movement of the parallelogram linkage assemblies in both transverse and longitudinal directions as the sides of the vehicle are being washed, the various protrusions, such as antennas, which would otherwise either stall the brushes or damage the vehicle will be readily accommodated. Furthermore, since the longitudinal movement of the linkage assemblies is spring-cushioned by springs 168-170 and 168'-170' and damped by shock absorbers 178-178', any erratic or uncontrollable swinging movement of the linkage assemblies is efficiently avoided.

Figure 17:
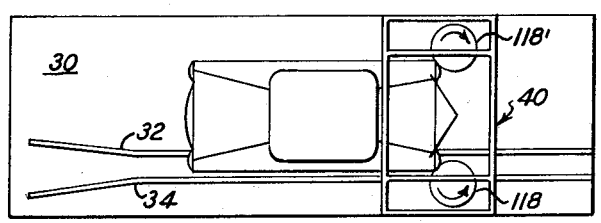
Figure 18:
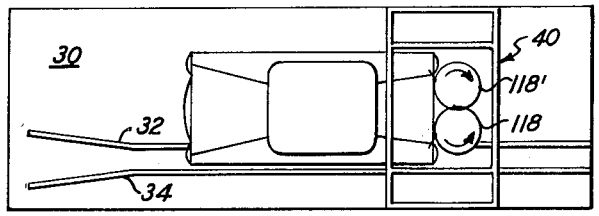

As the brushes again reach the front of the vehicle, as shown in FIG. 17, the linkage assemblies will be sequenced to wash the front of the vehicle in the same manner as described above with respect to the rear of the vehicle and as shown in FIG. 18.

Figure 19:
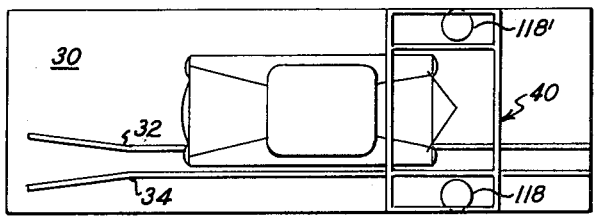
Figure 20:
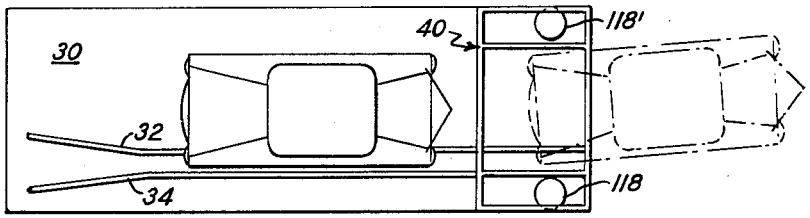

Thereafter, the rotation of the brushes will be stopped and the brushes withdrawn to their park positions as illustrated in FIG. 19. At this same time, the frame 40 will continue moving along the tracks until it reaches its standby or park position at the exit of the washing installation shown in FIG. 20 to complete the washing operation.

It should be understood of course, that various conventional detergent and water outlet nozzles may be utilized in conjunction with the present invention and their operation coordinated through suitable electrical timing and control networks with the movement of the frame 40 and the linkage assemblies 90 and 92. In addition, a top brush assembly of any desired conventional design may be carried upon the frame 40 for simultaneously washing the top surfaces of the vehicle as well as the front, rear and side surfaces thereof.

While the present invention has been described with respect to the movement of frame 40 past a stationary vehicle to be washed, it should be understood that the present invention may be utilized with equal efficacy in other installations such as those in which the vehicle is moved by a suitable conveyor past a stationary frame assembly.

Thus, the vehicle washing apparatus according to the present invention is not only simple and efficient in design but further assures the thorough washing of irregular front and rear surface contours of a vehicle to be washed, and readily accommodates vehicle protrusions such as antennas without damage thereof or disturbance of the washing sequence. In addition, the parallelogram linkage assemblies of the present invention are efficiently designed to permit controlled movement transversely of the vehicle as well as damped, spring-cushioned pivotal movement longitudinally thereof without exhibiting erratic or uncontrollable oscillatory movements in operation.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a vehicle washing installation, the combination comprising
   a frame longitudinally movable past a vehicle to be washed,
   a contiguous shaft mounted upon said frame transversely of the vehicle,
   parallelogram linkage means mounted on said frame for translational movement in a transverse plane and for longitudinal movement about a transverse axis,
   said linkage means comprising a horizontal crossbar and first and second spaced parallel connecting rods pivotally connected at the lower ends thereof to an outer end and an intermediate point, respectively, of said horizontal crossbar,
   brush means pivotally suspended from an inner end of said horizontal crossbar for rotation about a vertical axis,
   control means cooperating with said linkage means and said frame to selectively impart translational movement to said linkage means,
   spring means between said linkage means and said frame biasing said linkage means to a substantially vertical position and restraining the longitudinal movement thereof about said shaft, and
   damping means between said linkage means and said frame cooperating with said spring means to stabilize the longitudinal movement of said linkage means about said shaft,
   said control means including electrical switch means mounted upon said first connecting rod of said linkage means and actuator means mounted upon said second connecting rod of said linkage means, said actuator means selectively engaging said electrical switch means for actuating the same in response to translational movement of said linkage means.

2. The invention as recited in claim 1 wherein said control means comprises a pneumatic cylinder mounted between said linkage means and said frame and having a first actuated position extending said linkage means toward the interior of said frame, a second actuated position withdrawing said linkage means to a park position, and a vented position enabling free translational movement of said linkage means under the force of gravity.

3. The invention as recited in claim 2 wherein said control means comprises means for generating a supply of pressurized air, electrically operated valve means connected between said air pressure generating means and said pneumatic cylinder, and electrical sequencing means connected with said electrical switch means and said electrically operated valve means and responsive to actuation of said electrical switch means for sequentially operating said valve means to control the operative position of said pneumatic cylinder.

4. The invention as recited in claim 3 wherein a structural member of said frame is sealed to form an airtight chamber and cooperates with said air pressure generating means to provide an accumulator tank for said control means.

* * * * *